United States Patent
Mixon

(10) Patent No.: US 11,947,769 B2
(45) Date of Patent: Apr. 2, 2024

(54) INTERACTIVE MAP

(71) Applicant: William D. Mixon, Anna Maria, FL (US)

(72) Inventor: William D. Mixon, Anna Maria, FL (US)

( * ) Notice: Subject to any disclaimer, the term of this patent is extended or adjusted under 35 U.S.C. 154(b) by 292 days.

(21) Appl. No.: 16/936,156

(22) Filed: Jul. 22, 2020

(65) Prior Publication Data

US 2020/0356219 A1   Nov. 12, 2020

Related U.S. Application Data

(63) Continuation-in-part of application No. 15/985,602, filed on May 21, 2018, now Pat. No. 10,733,216.

(60) Provisional application No. 62/509,236, filed on May 22, 2017.

(51) Int. Cl.
*G06F 3/0481* (2022.01)
*G06F 3/04842* (2022.01)
*G06F 16/29* (2019.01)
*G09B 29/00* (2006.01)

(52) U.S. Cl.
CPC ........ *G06F 3/0481* (2013.01); *G06F 3/04842* (2013.01); *G06F 16/29* (2019.01); *G09B 29/007* (2013.01)

(58) Field of Classification Search
CPC ....... G06F 3/0481–04842; G06F 16/29; G09B 29/007
See application file for complete search history.

(56) References Cited

U.S. PATENT DOCUMENTS

| | | | |
|---|---|---|---|
| 8,019,532 B2* | 9/2011 | Sheha | G08B 25/10 340/995.14 |
| 8,302,033 B2 | 10/2012 | Matas et al. | |
| 8,755,824 B1* | 6/2014 | Wang | G06F 16/9537 455/456.3 |
| 9,043,134 B2 | 5/2015 | Rosekrans | |
| 9,158,414 B1 | 10/2015 | Gluzberg et al. | |
| 9,602,970 B1* | 3/2017 | Mahapatra | H04W 4/022 |
| 2011/0264370 A1 | 10/2011 | Jakobson et al. | |
| 2012/0159371 A1 | 6/2012 | Thrapp et al. | |
| 2014/0164118 A1* | 6/2014 | Polachi | G06Q 30/0261 705/14.57 |

(Continued)

OTHER PUBLICATIONS

Full First Action Interview Pilot Program webpage, retrieved from https://www.uspto.gov/patents/initiatives/first-action-interview/full-first-action-interview-pilot-program (Year: 2022).*

*Primary Examiner* — Calvin Cheung
(74) *Attorney, Agent, or Firm* — Camille A. Wilson; Wilson Dutra, PLLC

(57) ABSTRACT

The present disclosure provides a system that collects customer data in a way that creates a shared experience. More specifically, an interactive map for customer engagement is provided. In some embodiments, this information may be displayed at the establishment for other customers to view. This system and method may receive and save addresses to show where customers may originate from. Displaying an interactive map may allow a company to gather data from their customers while engaging the customers in a social sharing platform. This may increase the likelihood that a customer may provide the data and increase a sense of community within a customer pool.

20 Claims, 10 Drawing Sheets

(56) References Cited

U.S. PATENT DOCUMENTS

| | | |
|---|---|---|
| 2014/0199970 A1 | 7/2014 | Klotz |
| 2014/0365934 A1 | 12/2014 | Moore et al. |
| 2015/0281889 A1* | 10/2015 | Menendez ............ H04W 4/021 |
| | | 455/456.1 |
| 2016/0004723 A1 | 1/2016 | Pretel |
| 2016/0127485 A1 | 5/2016 | Tseng et al. |
| 2017/0303082 A1* | 10/2017 | Jones ...................... H04L 67/52 |
| 2018/0176166 A1 | 6/2018 | Philipson |
| 2018/0182140 A1* | 6/2018 | Biradar ................... G06T 11/60 |
| 2018/0189835 A1* | 7/2018 | DeLuca ............. G06Q 30/0246 |

* cited by examiner

Welcome!
Thanks for stopping by!

[ NAME ]

[ HOME TOWN ]

[ NAME TO DISPLAY ]

[ ASSOCIATIONS ▼ ]

ARE YOU OR WERE YOU IN THE ARMED FORCES?

☐ VETERAN  ☐ ACTIVE  ☐ RETIRED

[ SUBMIT ]

FIG. 3A

Welcome!
Thanks for stopping by!

[ SHARE ]  [ JOIN MAILING LIST ]
[ INTERACT WITH MAP ]
[ CLEAR INFO ]

FIG. 3B

INTERACTIVE MAP

CROSS-REFERENCE TO RELATED APPLICATION

This application is a Continuation in Part of pending U.S. Non-Provisional patent application Ser. No. 15/985,602 (filed May 21, 2018 and titled "INTERACTIVE MAP", which claimed priority to and the full benefit of U.S. Provisional Patent Application Ser. No. 62/509,236, filed May 22, 2017, and titled "INTERACTIVE MAP"), the entire contents of which are incorporated in this application by reference.

BACKGROUND OF THE DISCLOSURE

The advent of the internet has facilitated different ways for companies to measure their performance as well as the reach of their brands or experience. For example, a consumer may use a search engine to find a location, see how it has been rated, and compare these ratings or the location to whatever people in their social spheres do. Companies can run analytics to measure how they are performing in the market and tweak their messaging accordingly. Consumers can make more informed decisions as to how and where they want to spend their time.

As a company's reach grows exponentially, so too does the need to capture each consumer's information. Customer resource management provides a small piece for companies to maintain contact with a consumer after they visit their location, when they make a purchase, or when they sign up to be part of continued contact, such as a mailing list. However, there exists a need to capture a consumer's information at an establishment that streamlines the process while creating a social aspect for other consumers.

Further, community support and sharing have now become an essential part of reaching, acquiring, and keeping new customers. Social media has become prolific and a desire to share experiences with a community has become the norm. Currently, the majority of ways to share an experience occur on popular social media platforms.

SUMMARY OF THE DISCLOSURE

What is needed is a system and method for an establishment that may intake a customer's information and allow customers to feel like they are sharing their experience with a community. Accordingly, the present disclosure relates to a system that collects customer data in a way that creates and fosters a shared experience. In some embodiments, this information may be displayed at the establishment for other customers to view. More specifically, an interactive map for customer engagement is provided.

In some implementations, these inputs may be set by the establishment. In some aspects, the customer may receive correspondence based on their interests or data input. This system or method may receive and save addresses to show where customers may originate from. Displaying an interactive map may allow a company to gather data from their customers while engaging the customers in a social sharing platform. This may increase the likelihood that a customer may provide the data and increase a sense of community within a customer pool. As more customer information is received, the system or method may streamline the data that is displayed so that it is easier for other customers to navigate or add their information.

In some cases, an establishment may receive hundreds of data inputs, and the interactive map may allow customers to view the data inputs in an engaging manner, such as by providing sort, filter, and preference options. In some embodiments, the system or method may determine the most relevant input that may appeal to the customers of the establishment. In some implementations, the establishment may determine what to display based on a standardized input, customer feedback, or expectation as to how many people may be providing their information on a daily basis. The system or method may provide different views based on daily, weekly, monthly, quarterly, or yearly inputs.

One general aspect of the present disclosure may comprise a system for providing an interactive map. The system may comprise a display; one or more local input interfaces; one or more memory resources may comprise: a user profile database; one or more processors in communication with the display, one or more local input interfaces, and the one or more memory resources, wherein the one or more processors are configured to: receive a plurality of sets of pin data may comprise a first plurality of locations; define a first set of geofence boundaries based on the first plurality of locations; define a first local map may comprise at least the first set of geofence boundaries, wherein defining compares the first set of geofence boundaries to standard map boundaries; display an interactive map may comprise the first local map; and display a first plurality of pins based on the first plurality of locations on the first local map. Embodiments of this aspect may include corresponding computer systems, apparatus, and computer programs recorded on one or more computer storage devices, each configured to perform the actions of the methods.

Implementations may comprise one or more of the following features. In some aspects, the one or more processors may be further configured to: receive a manual location selection; define a selection set of geofence boundaries based on the manual location selection; and display one or more the first plurality of pins located within the selection set of geofence boundaries. In some embodiments, the selection set of geofence boundaries may be based on a threshold number of pins located within the selection set of geofence boundaries. In some implementations, a size of each pin may be based on a quantity of the first plurality of locations within the selection set of geofence boundaries. The first set of geofence boundaries may be based at least in part on city limits of each of the plurality of locations.

In some aspects, the one or more processors may be further configured to: receive a second set of pin data may comprise a second plurality of locations; define a second set of geofence boundaries based on the second plurality of locations; define a second local map may comprise at least the second set of geofence boundaries, wherein defining compares the second set of geofence boundaries to standard map boundaries; define a third set of geofence boundaries based on comparing the first local map to the second local map identify a second pin area, wherein the third set of geofence boundaries contain both the first set of geofence boundaries and the second set of geofence boundaries; and define a second local map may comprise at least the third set of geofence boundaries, wherein defining compares the third set of geofence boundaries to standard map boundaries.

In some implementations, the one or more processors may be further configured to: display a second interactive map may comprise the second local map; and display a second plurality of pins based on the first plurality of locations and the second plurality of locations on the second local map. The one or more processors are further configured to:

compare the first plurality of locations to the second plurality of locations, wherein the comparing identifies a proximity between each of the first plurality of locations and each of the second plurality of locations; and define a plurality of pin geofence boundaries of the second plurality of pins based on the comparing of the first plurality of locations to the second plurality of locations, wherein the defining occurs where the proximity is less than a predefined threshold distance, and wherein display of the second plurality of pins may comprise a pin for each of the plurality of pin geofence boundaries.

In some embodiments, a size of each pin is based on a quantity of the first plurality of locations and the second plurality of locations within each of the plurality of pin geofence boundaries. The one or more processors may be further configured to: associate one or more pin type with the first plurality of pins, wherein display of each of the first plurality of pins is displayed according to at least one of the one or more pin types. Implementations of the described techniques may include hardware, a method or process, or computer software on a computer-accessible medium.

One general aspect of the present disclosure may comprise a method for displaying an interactive map. The method may comprise receiving a first plurality of sets of pin data may comprise a first plurality of locations; defining a first set of geofence boundaries based on the first plurality of locations; defining a first local map may comprise at least the first set of geofence boundaries, wherein defining compares the first set of geofence boundaries to standard map boundaries; displaying an interactive map may comprise the first local map; and displaying a first plurality of pins based on the first plurality of locations on the first local map. Embodiments of this aspect may include corresponding computer systems, apparatus, and computer programs recorded on one or more computer storage devices, each configured to perform the actions of the methods.

Implementations may comprise one or more of the following features. In some embodiments, the geofence boundaries of the first set of geofence boundaries may be based at least in part on city limits of the first plurality of locations. In some aspects, the comparing identifies a proximity between each of the first plurality of locations; and defining a plurality of pin geofence boundaries of the first plurality of pins based on the comparing of the first plurality of locations, wherein the defining occurs where the proximity is less than a predefined threshold distance. In some implementations, a size of each pin may be based on a quantity of the first plurality of locations within each of the plurality of pin geofence boundaries.

In some aspects, defining compares the second set of geofence boundaries to standard map boundaries; defining a third set of geofence boundaries based on comparing the first local map to the second local map identify a second pin area, wherein the third set of geofence boundaries contain both the first set of geofence boundaries and the second set of geofence boundaries; and defining a second local map may comprise at least the third set of geofence boundaries, wherein defining compares the third set of geofence boundaries to standard map boundaries. The method may comprise: displaying a second interactive map may comprise the second local map; and displaying a second plurality of pins based on the first plurality of locations and the second plurality of locations on the second local map.

In some embodiments, the comparing may identify a proximity between each of the first plurality of locations and each of the second plurality of locations; and define a plurality of pin geofence boundaries of the second plurality of pins based on the comparing of the first plurality of locations to the second plurality of locations, wherein the defining occurs where the proximity is less than a predefined threshold distance, and wherein display of the second plurality of pins may comprise a pin for each of the plurality of pin geofence boundaries. A size of each pin is based on a quantity of the first plurality of locations and the second plurality of locations within each of the plurality of pin geofence boundaries. Display of each of the first plurality of pins may be displayed according to at least one of the one or more pin types. The first plurality of sets of pin data further may comprise at least one association. Implementations of the described techniques may include hardware, a method or process, or computer software on a computer-accessible medium.

A system of one or more computers may be configured to perform particular operations or actions by virtue of having software, firmware, hardware, or a combination of them installed on the system that in operation causes or cause the system to perform the actions. One or more computer programs may be configured to perform particular operations or actions by virtue of including instructions that, when executed by data processing apparatus, cause the apparatus to perform the actions.

BRIEF DESCRIPTION OF THE DRAWINGS

The accompanying drawings, that are incorporated in and constitute a part of this specification, illustrate several embodiments of the disclosure and, together with the description, serve to explain the principles of the disclosure:

FIG. 3A illustrates an exemplary embodiment of a local input device, according to some embodiments of the present disclosure.

FIG. 3B illustrates an exemplary embodiment of a local input device, according to some embodiments of the present disclosure.

DETAILED DESCRIPTION

The present disclosure provides generally for a system that collects customer data in a way that creates a shared experience. More specifically, an interactive map for customer engagement is provided. In some embodiments, this information may be displayed at the establishment for other customers to view. This system and method may receive and save addresses to show where customers may originate from. Displaying an interactive map may allow a company to gather data from their customers while engaging the customers in a social sharing platform. This may increase the likelihood that a customer may provide the data and increase a sense of community within a customer pool.

In the following sections, detailed descriptions of examples and methods of the disclosure will be given. The description of both preferred and alternative examples, though thorough, are exemplary only, and it is understood that to those skilled in the art variations, modifications, and alterations may be apparent. It is therefore to be understood that the examples do not limit the broadness of the aspects of the underlying disclosure as defined by the claims.

Glossary

Pin Type: as used herein refers to an appearance of a pin on an interactive map. In some aspects, the pin type may be different based on predefined parameters. For example, the default pin type may comprise a typical pin shape, and the pin type may comprise a flag for those who indicate they served in the armed forces. In some embodiments, pin types may vary within an association, such as a unique pin type for each branch of the armed forces.

Pin: as used herein refers to a digital geographic indicator. In some aspects, a pin may indicate a precise location. In some embodiments, a pin may indicate a pin area generally, such as in the center of the pin area.

Pin Area: as used herein refers to the geofencing boundaries associated with a pin. In some aspects, a pin area may be based on city limits. In some embodiments, the pin area may vary over time as more pin data may be received and processed.

Pin Data: as used herein refers to any data that may be associated with a pin. In some implementations, pin data may comprise location data, such as a home city. In some embodiments, pin data may include a visit date or other relevant data.

Interactive Map: as used herein refers to a digital display of a geographic region, such as a country, state, or city, as non-limiting examples, wherein the digital display may be modified by users, such as through input of pin data or input of preferences.

Figure 1A:
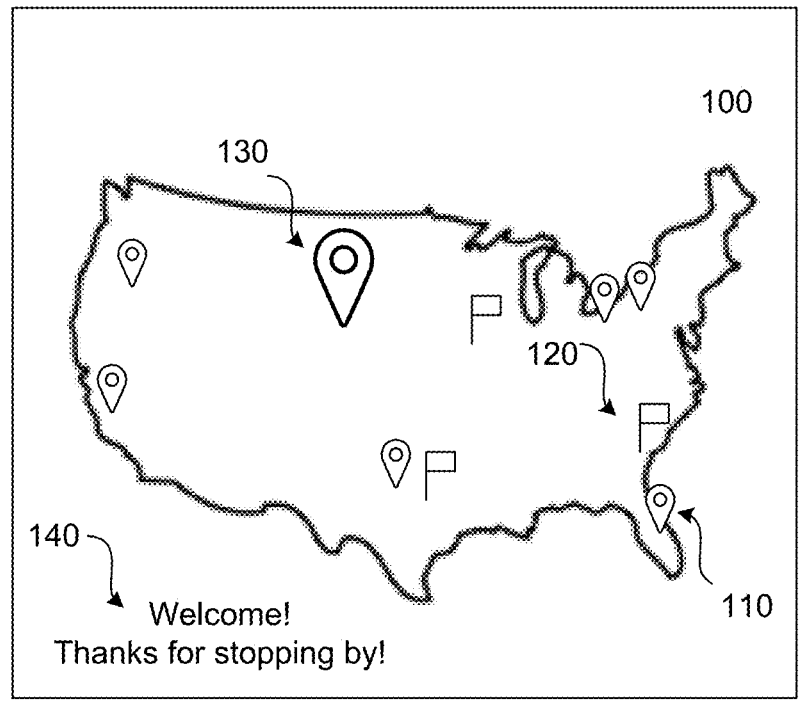
FIG. 1A illustrates an exemplary interactive map, according to some embodiments of the present disclosure.

Referring now to FIG. 1A, an exemplary interactive map 100 is illustrated. In some aspects, an interactive map 100 may comprise geographic indicators, such as country borders, state lines, or roadways, as non-limiting examples. In some embodiments, the geographic segment displayed in an interactive map 100 may vary based on the needs of a company. For example, if the majority of customers for a company hail from the same state, presenting a single state with pins may create a better sense of community than would showing an entire country with a cluster of pins around the state. As another example, where a company may want to portray themselves as a global corporation, the interactive map may comprise the world, and customers may see where they fit in internationally, which may allow them to feel part of a global community.

In some implementations, an interactive map 100 may contain a plurality of pins 120, 110 based on received pin data. In some embodiments, when a new set of pin data may be received, a new pin 130 may appear on the interactive map 100 and may temporarily appear larger so that a user may be able to see their new pin 130 more easily. In some aspects, the interactive map 100 may present a general welcome message 140 when new pin data may be received.

In some embodiments, a company may be able to customize the interactive map 100, such as by including their logo. In some aspects, the company may be able to control how an interactive map 100 may cycles through information, such as menus, advertisements, or location-specific information. For example, an international company may want to cycle between global, country, and city views. As another example, a company may insert advertising or information throughout the day. In some aspects, nonprofits may be required to keep a donor list posted, which may be integrated with the interactive map 100. The donor list may be cycled through other screens. In some embodiments, the donor list may be integrated directly within the interactive map 100, such as assigning a pin type to donors and indicating where the donors may be from. In some implementations, a user may be able to select from different languages, which may allow for international engagement with the interactive map 100.

Figure 1B:
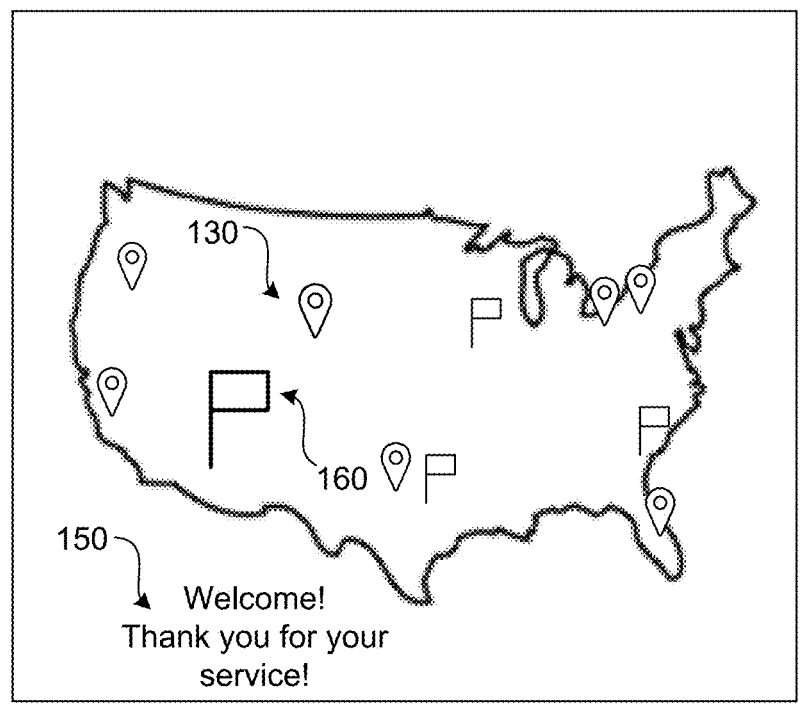
FIG. 1B illustrates an exemplary interactive map, according to some embodiments of the present disclosure.

Referring now to FIG. 1B, an exemplary interactive map 100 is illustrated. In some embodiments, the new pin 130 may become the same size as the plurality of pins 120, 110 after a predefined amount of time or once new pin data may be received. In some implementations, new pin data may indicate that a user may have an association, such as serving in the armed forces or being part of AARP, and a new flag pin 160 may appear on the interactive map 100. In some aspects, a custom welcome message 150 may be presented based on the association.

In some implementations, a pin size may be based on the number of pin data sets in that location, such as when an amount exceeds a threshold amount. In some embodiments, pins may be grouped based on a threshold distance from a central location, such as a large city or landmark. For example, an Atlanta pin may incorporate regions technically outside of the city limits but still proximate, such as Athens, Duluth, or Marietta. In some aspects, a large central pin may be cleaner than a cluster of small pins around the same area. This may be controllable by user, such as based on preferences, the relative size of the local map, or number of pins in any area. For example, if the entire local map is Atlanta and the nearby areas, a single pin on Atlanta may not be useful, whereas if the entire local may is the United States, then a single pin on Atlanta may be preferred.

In some embodiments, the types of associations that may be collected in the pin data may depend on the company offering the interactive map 100. For example, a children's museum may prompt input of associations that may be interesting to children, such as Girl Scouts, Boy Scouts, or Boys and Girls Club. As another example, an amusement park may want to highlight the frequency of visits for any given user, and the association may be "frequent flier" for those who may have visited the location more than ten times in the past year. As another example, a convention may want to highlight the occupational diversity and prompt input of a user's occupation.

Figure 2A:
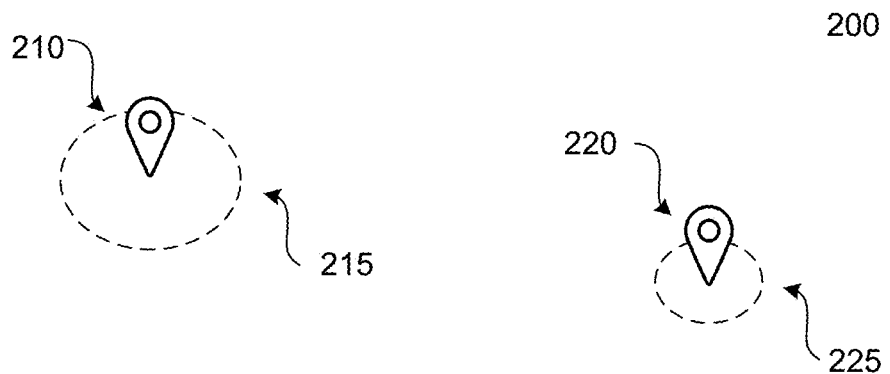
FIG. 2A illustrates a map segment with exemplary pins and pin areas, according to some embodiments of the present disclosure.

Referring now to FIG. 2A, a map segment with exemplary pins 210, 220 and pin areas 215, 225 is illustrated. In some embodiments, a rural pin 210 may be placed in the middle of a rural city limits pin area 215, and a metropolitan pin 220 may be placed in the middle of a metropolitan city limits pin area 225. In some aspects, a rural city limits pin area 215 may be larger than a metropolitan city limits pin area 225.

The city pin area 225 may be smaller with a larger concentration of population, and the rural city limits pin area 225 may be more expansive with a lower concentration of population. In some implementations, the area directly outside the metropolitan city pin area 225 may be suburban towns.

Figure 2B:
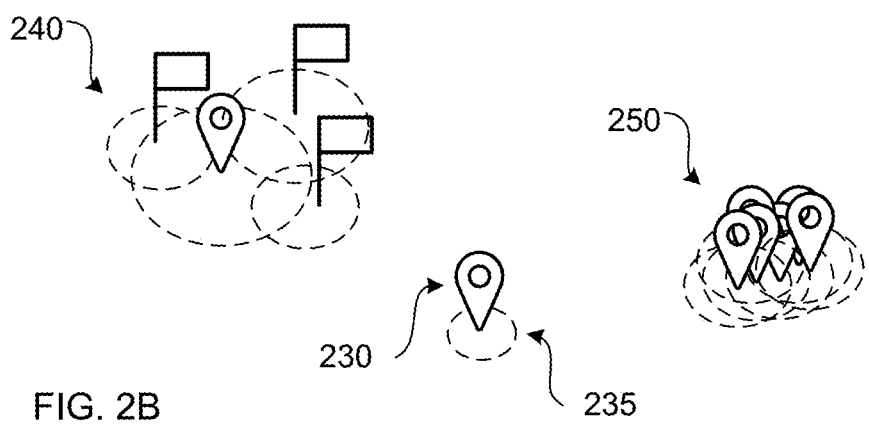
FIG. 2B illustrates a map segment with exemplary pins and pin areas, according to some embodiments of the present disclosure.

Referring now to FIG. 2B, a map segment with exemplary pins 230 and pin groupings 240, 250 is illustrated. In some aspects, an interactive map 200 may comprise multiple rural pins 240. In some embodiments, a portion of the multiple rural pins 240 may comprise a different pin type, such as flags. In some implementations, a new small town pin 230 may be placed within the small town city limit pin area 235. In some embodiments, a cluster of metropolitan and urban pins 250 may be placed on the interactive map 200.

Figure 2C:
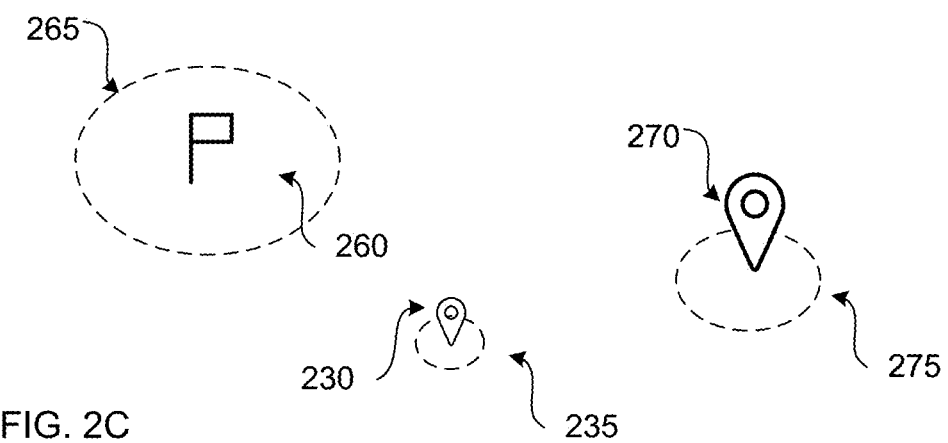
FIG. 2C illustrates a map segment with exemplary pins and pin areas, according to some embodiments of the present disclosure.

Referring now to FIG. 2C, a map segment with adjusted pin areas 265, 275 is illustrated. In some aspects, the cluster of metropolitan and urban pins 250 may be combined into a single big city pin 270 and placed in a big city pin area 275. In some embodiments, a big city pin area 275 may encompass the farthest boundaries within the cluster of metropolitan and urban pins 250. In some implementations, the big city pin area 275 may include the original metropolitan city limit pin area 225 and extend a predefined distance beyond it, wherein pins with a pin area that may overlap with that big city pin area 275 may be grouped with the big city pin 270.

In some aspects, a general rural pin 260 may be placed in a general rural pin area 265. In some embodiments, the general rural pin area 265 may encompass a larger area, such as defined by the borders of multiple rural pins 240. In some implementations, grouping pins and pin areas may allow for easier viewing of an interactive map. For example, the cluster of metropolitan and urban pins 250 may clutter the interactive map without providing more information to a user, whereas a big city pin 270 may provide similar information in a more visually conducive manner.

In some aspects, the adjusted pins may be customized to provide more information. For example, the big city pin 270 may be larger than the small town pin 230, which may indicate that more users are from the big city pin area 275 than the small town pin area 235. In some implementations, the pin type may be indicative of the majority of users from that area. For example, the majority of users in a general rural pin area 265 may have served in the armed forces, and the representative pin type may be a flag.

Referring now to FIG. 3A, an exemplary embodiment of a local input device 300 is illustrated. In some aspects, the local input device 300 may prompt for direct input of personal data. In some embodiments, the collected information may comprise pin data 320. In some implementations, not shown, the local input device 300 may collect other personal data, such as contact information, which may allow the company to integrate the customer into their customer management systems.

In some aspects, the local input device 300 may provide a welcome message 310. In some implementations, the local input device 300 may comprise a submit function. In some embodiments, the pin data 320 may include associations in a drop down menu or in a check box format.

Referring now to FIG. 3B, an exemplary embodiment of a local input device 300 is illustrated. In some aspects, a small version of an interactive map 340 may be presented with a pin in the location from the submitted pin data 320. In some embodiments, action prompts 350 may be available to the user. For example, a user may be able to opt in to or opt out of a mailing list or share their pin data, such as through social media platforms. As another example, the user may be able to interact with the interactive map from the local input device 300. In some aspects, the local input device 300 may comprise a portable device, such as a tablet, laptop, or smartphone. In some embodiments, the local input device 300 may comprise a stationary base, such as a kiosk.

In some embodiments, a company may submit some of the personal data to a third party, which may extend the engagement opportunities. For example, the personal data may be sent to a review platform, wherein the user may receive an email prompt to leave a review of the company. In some aspects, the personal data may include a mobile phone number, and the user may be able to opt in to receiving text messages. In some embodiments, the texts may include a version of or a link to an interactive map.

In some implementations, the interface may allow for locations outside the interactive map 340. For example, some interfaces may allow users to select locations outside the interactive map 340. In some embodiments, selected locations outside the interactive map 340 may be treated differently than selections within the boundaries of the interactive map 340. For example, the selections may be treated as discrete selections that may not be grouped.

In some aspects, the user may be able to clear information 360 after input of their personal data. In some embodiments, the local input device 300 may be cleared periodically after a predefined length of inactivity. In some implementations, the personal data may be cleared on the local input device 300 once a user submits their information. Allowing the user to clear information 360 may provide a sense of security so that users that directly follow may not be able to access or view the user's personal data.

In some aspects, the local input device 300 may reassure users that all their personal information is secure within the interface. In some aspects, some interfaces may fully encrypt the input data. In some embodiments, a portion of the personal information may be shared with other non-related third-party outlets. For example, an interface may discretely release area codes, mailing information, and other non-limiting examples, which may provide demographic data without personal identification that may put users on the interface at risk. In some aspects, a portion of the data may be encrypted to limit security risk.

In some embodiments, the local input device 300 may enable the user to enter their location in a free form. For example, the user may enter their area code, state, country, mailing address and other non-limiting examples that may create unique inputs. In some embodiments, a pin system may be used within the interactive map 340 to help narrow down regions or areas if precise addresses are not given.

In some embodiments, different locations may be linked, where pin data may be shared between the locations. For example, users may be incentivized to input their personal data at various locations by a point system, where each log in may give a user points. The points may be redeemable for rewards or badges, which may be shared through one or both the interactive map and social media. In some aspects, the local input device 300 may prompt a "club ID" that may allow the system to access previously submitted personal data. In some embodiments, the local input device 300 may comprise a scanner that may be configured to scan predefined forms of identification, such as passports or driver's licenses, which may allow for easier input of basic personal data.

In some implementations, the system may filter content, such as by removing language deemed inappropriate. For example, as a joke, a user may input a false name with vulgar words, and the system may filter or adjust the input to remove the inappropriate language. In some embodiments, the system may perform an address look up to verify locations. In some implementations, the address look up may be live wherein the user may be prompted to select from a drop down list. In some aspects, a company may customize the inputs, such as whether a location must include an entire address or just the city. In some embodiments, the input parameters may depend on the needs of the company. For example, if the address is to be used for a physical mailing, then the entire address may be useful. As another example, the address may be used to collect demographic data but correspondence may be exclusively electronic, so prompting country, city, and state may be sufficient.

Figure 4:
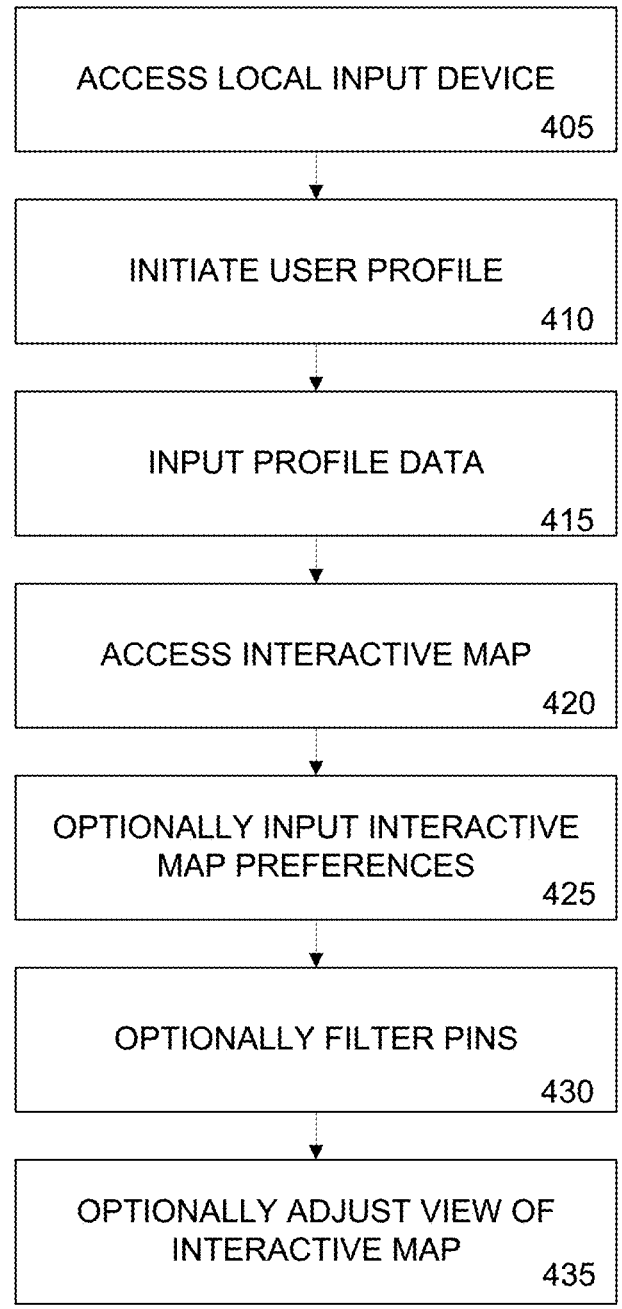
FIG. 4 illustrates exemplary method steps for interacting with an interactive map.

Referring now to FIG. 4, exemplary method steps for interacting with an interactive map are illustrated. At 405, a local input device may be accessed. At 410, a user profile may be initiated. At 415, profile data may be input. At 420, an interactive map may be accessed. In some embodiments, at 425, interactive map preferences may be input. In some aspects, at 430, pins may be filtered. In some implementations, at 435, a view of the interactive map may be adjusted.

At 410, the interface may provide more informational and unique tooltip prompts for each filed within the interface. At 410 and 415, the Tooltips and field headings may be customizable by the user interacting with the interface. In some aspects, there may be a limit at which each field length may be displayed on the interface. In some embodiments, the user may have the option to extend the field length within the interface to allow for greater customization.

In some embodiments, at 420 a company may have its own unique verbiage for their interactive map. In some embodiments, the opt-in and opt-out checkboxes may include a company's unique verbiage as well. For example, one company may have a different overlay on their interactive map than another company based on their respective verbiages used on the checkboxes in the interface. In some implementations, each user for the company may have full control to opt in, opt out, or select neither for their perspective company on the interface.

In some embodiments, if a user opts-out of receiving correspondence, then the system may be prevented from sending an email to that user but does in fact still capture information to display as a pin on the interactive map. In some aspects, if the user opts-in then an email will be sent to them, if and only if, the opt-in checkbox was selected. In some embodiments, if a user does opt-in but changes their mind then an unsubscribe option will be available within the interface.

In some implementations, data from opt-in users may be treated and stored separately. Data collected from users who may not want correspondence may not be stored or registered as discrete information and instead grouped or aggregated. For example, if a user has clicked unsubscribe or opt-out and confirms then they may need to restart the entire process over if they wish to opt back in. In some embodiments, if the user selects unsubscribe then an initial email will be sent and from there additional information may not be downloaded from the database.

Figure 5:
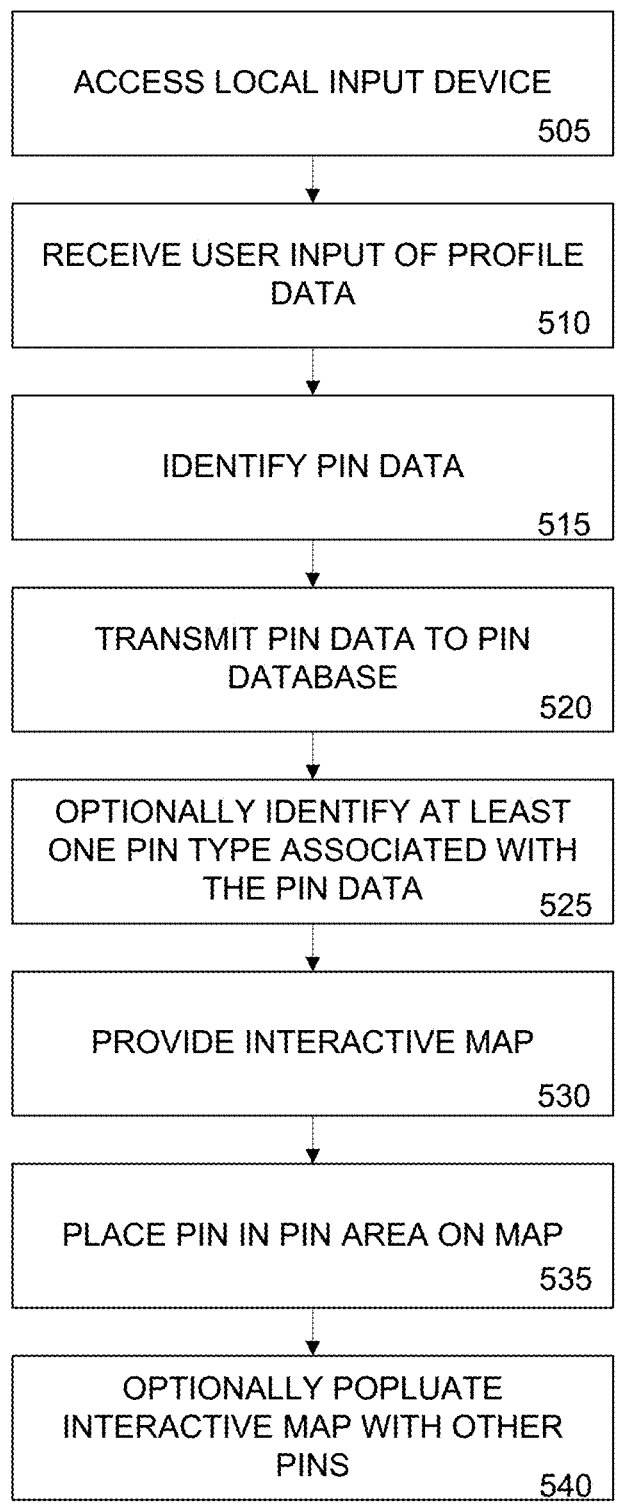
FIG. 5 illustrates exemplary method steps for providing an interactive map.

Referring now to FIG. 5, exemplary method steps for providing an interactive map are illustrated. At 505, a local input device may be accessed. At 510, a user input of profile data may be received. At 515, pin data may be identified. At 520, pin data may be transmitted to a pin database. In some embodiments, at 525, at least one pin type may be associated with the pin data. at 530, an interactive map may be provided. At 535, a pin may be placed in the pin area of an interactive map. In some implementations, at 540, other pins may be populated on the interactive map.

In some implementations, additional filters may be added to export information. In some aspects, the filters may allow for additional customization of information and added categories to make pins more unique and users easier to distinguish. In some aspects, the filters may include date range, military association, opt-in or opt-out options, and other non-limiting examples. In some aspects, accessibility may be key when it comes to multi-ownership based on preferences. In some embodiments, the extra filters may help distinguish between multiple users on the same interactive map or pin, with similar names, and other non-limiting examples.

In some embodiments, each party or entity may have the ability to share different threads or extensions of information based on their filters and preferences as well. In some implementations, a party may refuse to share some information but include other information. For example, the user may refrain from sharing their mailing address and zip code but give the state in which they live in. In some aspects, the user may enable all of their information to be shared on the interface and have no preference to which is withheld.

Figure 6:
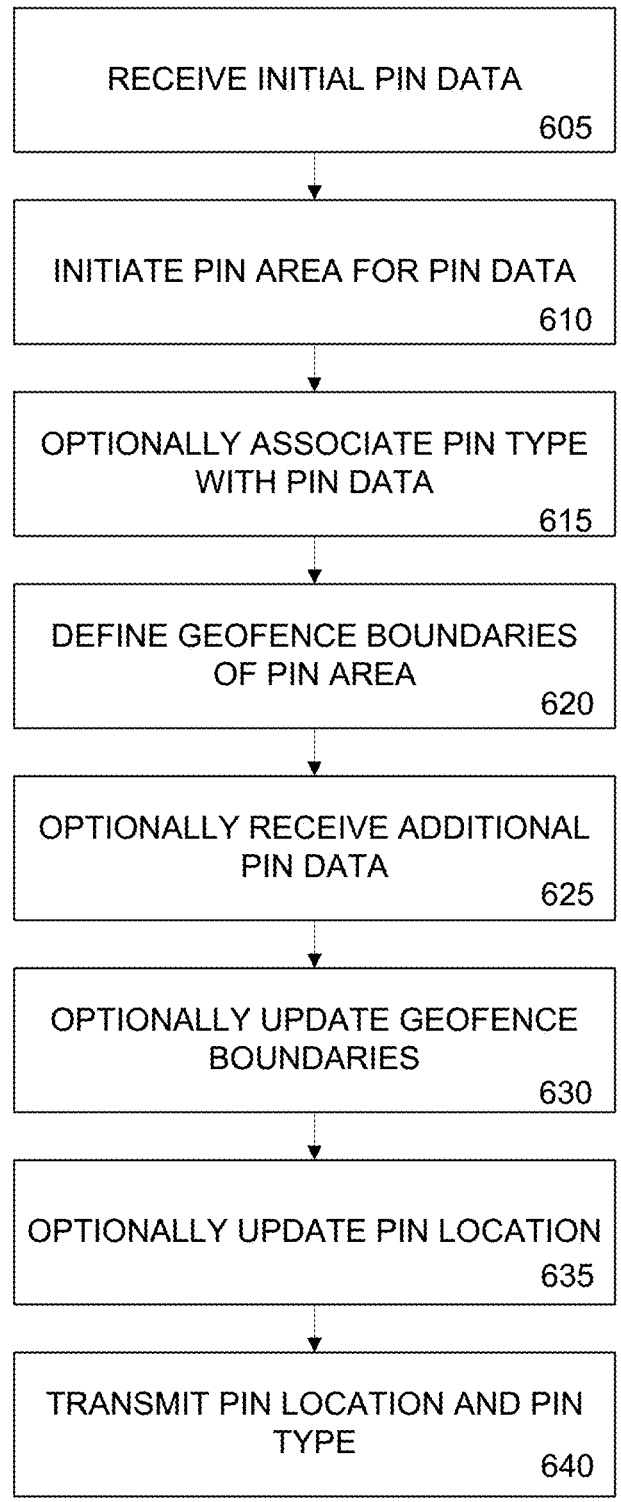
FIG. 6 illustrates exemplary method steps for defining a pin area.

Referring now to FIG. 6, exemplary method steps for defining a pin area are illustrated. At 605, initial pin data may be received. At 610, a pin area for pin data may be initiated. In some aspects, at 615, a pin type may be associated with pin data. At 620, geofence boundaries of a pin area may be defined. In some implementations, at 625, additional pin data may be received. In some embodiments, at 630, geofence boundaries may be updated. In some aspects, at 635, a pin location may be updated. At 640, a pin location and pin type may be may transmitted. In some aspects, multiple pin data may be received, such as where multiple users may simultaneously access the display. Where multiple pin data may be received, the system may collect the pin data in parallel and prioritize complete pin data to populate the display map.

In some embodiments, a set or sets of pin data may be received, such as from a group of people. In some aspects, the system may be set to group received pin data by threshold amounts or parameters, such as by date. In some implementations, geofence boundaries of each pin data may be defined, such as by city limits, jurisdictional boundaries, zip codes, area codes, regions, or neighborhoods. In some embodiments, the geofence boundaries of the set or sets of pin data may determine the displayed "local" map, wherein the local geofence boundaries may be based on the individual geofence boundaries of the pin data.

For example, locations in sets of pin data may only include Florida cities, and the local geofence boundaries may comprise the state lines of Florida. If another set of pin data includes a location outside of Florida, the local map display may change to include the new location. In some aspects, a local map may be manually selected. In some aspects, a user may input a location or click an area on the display map, and the local map may adjust to geofence boundaries for that manually selected area. The local map may display pins within that selected area. For example, a user may click on Houston, and the local map may comprise the city limits of Houston, or if there are nearby pin locations, the local map may comprise Houston and its nearby cities.

In some embodiments, the local map may depend on how many pins may be located in the area. For example, a user may select Macon, Georgia, which is somewhat near Atlanta. There may not be many pins within the city limits of Macon, so the local map may include Atlanta or Savannah to show a meaningful display.

In some aspects, the interface may allow users to attach their entry to a category. In some aspects, a company may add icons that allow users to select which category they would like to attach their entry to. In some embodiments, this may be an optional feature within certain companies or interfaces. In some implementations, the different icons may be downloaded to different customers within the interface based on their preferences and needs. In some embodiments, the multiple categories may be selected per pin/icon depending on what the company or user decides. For example, the company may select the category "Olympics" and the subcategories may include 100 meter, high jump, or javelin throw, where users may be able to self-identify as a fan or participant in each sport by selecting the subcategory icon display. In some embodiments, the icon may appear next to the username on the map.

In some aspects, if the category or association is military involvement they may have unique icon next to their name along with the flag of where they are stationed or what country they are serving. In some embodiments, the user may override their default flag with another if they choose to with an override specifically for military personnel. In some implementations, the flag or icon next to their name may come with a unique military pin that identifies them as military personnel.

Figure 7:
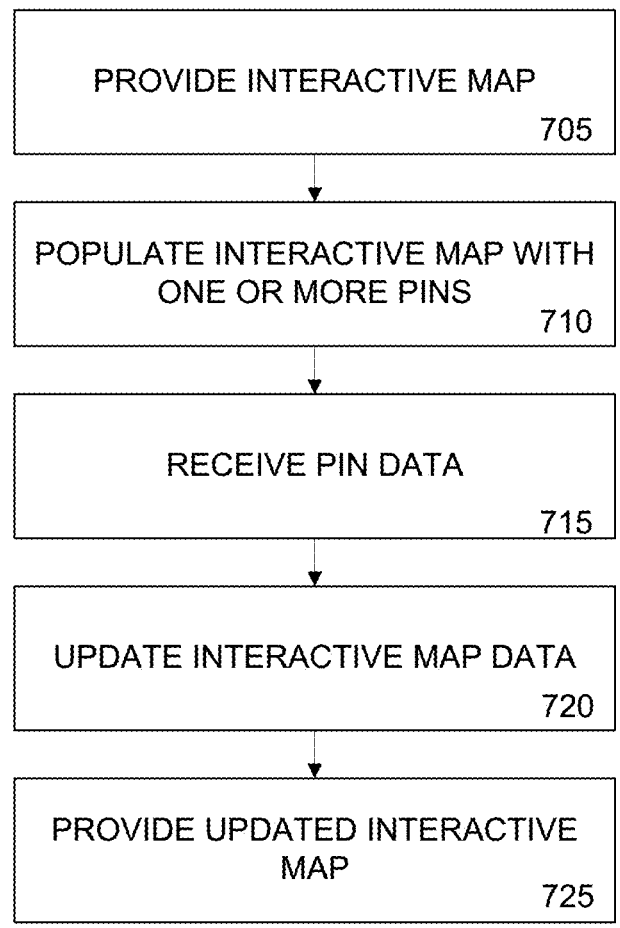
FIG. 7 illustrates exemplary method steps for updating an interactive map.

Referring now to FIG. 7, exemplary method steps for updating an interactive map are illustrated. At 705, an interactive map may be provided. At 710, an interactive map may be populated with one or more pins. At 715, pin data may be received. At 720, interactive map data may be updated. At 725, an updated interactive map may be provided.

In some implementations, the interactive map may display advertisements throughout the pins and different interactive aspects. In some aspects, companies may display any amount of advertisements they want across their interface. In some embodiments, companies may display a limited number of advertisements at once, such as based on space, subscription level, or preferences. For example, a company may list up to twenty advertisements on their interactive map. In some embodiments, the ads may be continuously looped on the interface in the order in which they are entered by the company.

In some implementations, user may set up the amount of time they wish for each advertisement to loop of advertisement. In some embodiments, the user may have full control over the quality and type of content each of the advertisements on the interface has. In some embodiments, the user may add and delete any content or advertisement that is displayed on the interface. For example, some advertisements may be seasonal, and the user may then control the times in which the advertisement is displayed throughout the year. In some embodiments, the user may control what times of day each advertisement comes on the interface, or at days of the week certain advertisements play.

In some implementations, the user may have control of special announcements that are displayed throughout the interface. In some embodiments, this system may work like the advertisement system in which the user may have full control over when and how the announcements are played on the interface. In some aspects, the user may control audio to the announcements at a desired level and speed. In some aspects, the user may link the interface and interactive map to social media platforms to help grow network and for larger access to audio and video and other forms of entertainment on the interface.

For example, the interface may connect to social media or media sharing platforms to play clips for advertisements or show does of relevant announcements on the interface. In some aspects, the user may control the size of the media on the interface. For example, they may make the media fullscreen for an important announcement. In some embodiments, the user may control the length of the media and the duration it may stay full screen on the interface.

Figure 8:
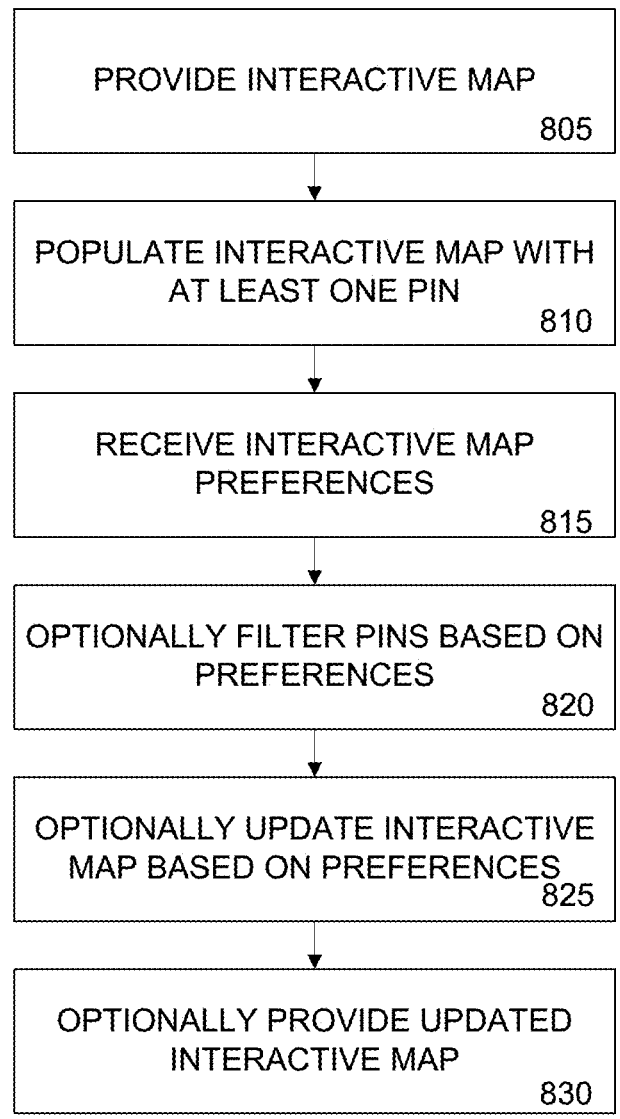
FIG. 8 illustrates exemplary method steps for providing an interactive map.

Referring now to FIG. 8, exemplary method steps for providing an interactive map are illustrated. At 805, an interactive map may be provided. At 810, an interactive map may be populated with at least one pin. At 815, interactive map preferences may be received. In some embodiments, at 820, pins may be filtered based on preferences. In some aspects, at 825, an interactive map may be updated based on preferences. In some implementations, at 830, an updated interactive map may be provided. In some embodiments, preferences and filtering abilities may include metadata associated with pin data, such as date and time of input.

In some aspects, the interface may be coded to run a small dedication external computer running native software. In some embodiments, the interface may have the ability to have multiple displays and sign-in tablets at one location to share and display multiple pins. In some implementations, the interactive map may have a built-in restart display to clear all ram, cache, and cookies to optimize performance.

In some implementations, unattended access of the external computer may use troubleshooting and maintenance using a remote access system. In some embodiments, the interface may be used on tablets for sign in purposes, remote programming, kiosk lockout, and ease of setup by using a premade template. For example, a mobile tablet may be used to navigate the interface as a consumer and edit the interface as a user. In some aspects, the tablet may be used to connect to a television for a larger display screen when displaying in front of larger audiences.

In some embodiments, connecting to a larger display may help the tablet connect to an uninterrupted power supply. In some embodiments, the interface may display on the larger display screen, even when the tablet may be asleep or locked. For example, advertisements, media and other monetized interface media may automatically play on a larger display screen despite the tablet being locked.

For example, a company may be open from 8 am to 10 pm. Pin data may be collected throughout the day, and metadata may be collected along with the pin data. Preferences may allow a user to view day pins separately from night pins.

Figure 9:
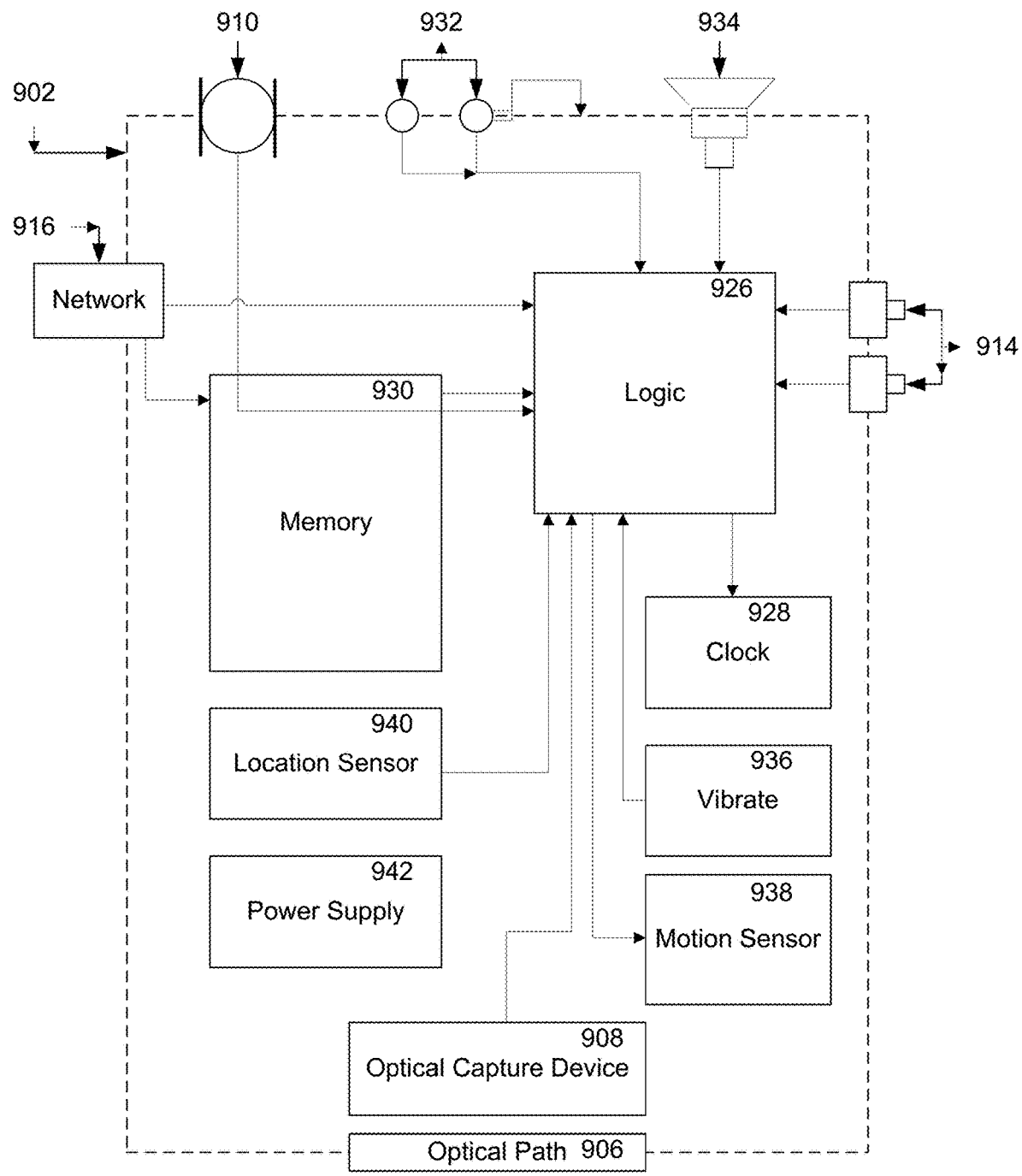
FIG. 9 illustrates an exemplary block diagram of an exemplary embodiment of a local input device.

Referring now to FIG. 9, an exemplary block diagram of an exemplary embodiment of a local input device 902 is illustrated. The mobile device 902 may comprise an optical capture device 908, which may capture an image and convert it to machine-compatible data, and an optical path 906, typically a lens, an aperture, or an image conduit to convey the image from the rendered document to the optical capture device 908. The optical capture device 908 may incorporate a Charge-Coupled Device (CCD), a Complementary Metal Oxide Semiconductor (CMOS) imaging device, or an optical sensor of another type.

In some embodiments, the mobile device 902 may comprise a microphone 910, wherein the microphone 910 and associated circuitry may convert the sound of the environment, including spoken words, into machine-compatible signals. Input facilities 914 may exist in the form of buttons, scroll-wheels, or other tactile sensors such as touch-pads. In some embodiments, input facilities 914 may include a touchscreen display. Visual feedback 932 to the user may occur through a visual display, touchscreen display, or indicator lights. Audible feedback 934 may be transmitted through a loudspeaker or other audio transducer. Tactile feedback may be provided through a vibration module 936.

In some aspects, the mobile device 902 may comprise a motion sensor 938, wherein the motion sensor 938 and associated circuitry may convert the motion of the mobile device 902 into machine-compatible signals. For example, the motion sensor 938 may comprise an accelerometer, which may be used to sense measurable physical acceleration, orientation, vibration, and other movements. In some embodiments, the motion sensor 938 may comprise a gyroscope or other device to sense different motions.

In some implementations, the mobile device 902 may comprise a location sensor 940, wherein the location sensor 940 and associated circuitry may be used to determine the location of the device. The location sensor 940 may detect Global Position System (GPS) radio signals from satellites or may also use assisted GPS where the mobile device may use a cellular network to decrease the time necessary to determine location. In some embodiments, the location sensor 940 may use radio waves to determine the distance from known radio sources such as cellular towers to determine the location of the mobile device 902. In some embodiments these radio signals may be used in addition to and/or in conjunction with GPS.

In some aspects, the mobile device 902 may comprise a logic module 926, which may place the components of the mobile device 902 into electrical and logical communication. The electrical and logical communication may allow the components to interact. Accordingly, in some embodiments, the received signals from the components may be processed into different formats and/or interpretations to allow for the logical communication. The logic module 926 may be operable to read and write data and program instructions stored in associated storage 930, such as RAM, ROM, flash, or other suitable memory. In some aspects, the logic module 926 may read a time signal from the clock unit 928. In some embodiments, the mobile device 902 may comprise an on-board power supply 942. In some embodiments, the mobile device 902 may be powered from a tethered connection to another device, such as a Universal Serial Bus (USB) connection.

In some implementations, the mobile device 902 may comprise a network interface 916, which may allow the mobile device 902 to communicate and/or receive data to a network and/or an associated computing device. The network interface 916 may provide two-way data communication. For example, the network interface 916 may operate according to an internet protocol. As another example, the network interface 916 may comprise a local area network (LAN) card, which may allow a data communication connection to a compatible LAN. As another example, the network interface 916 may comprise a cellular antenna and associated circuitry, which may allow the mobile device to communicate over standard wireless data communication networks. In some implementations, the network interface 916 may comprise a Universal Serial Bus (USB) to supply power or transmit data. In some embodiments, other wireless links known to those skilled in the art may also be implemented.

Figure 10:
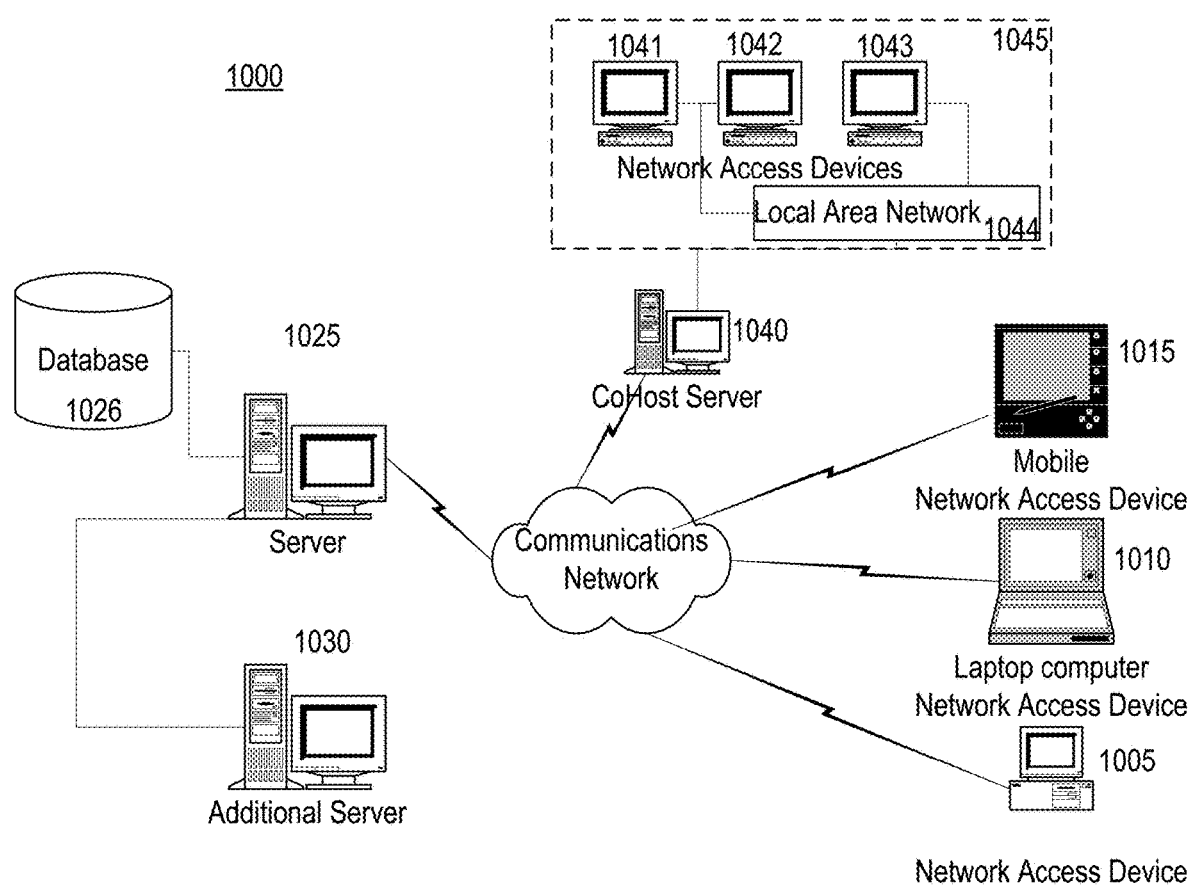
FIG. 10 illustrates an exemplary processing and interface system.

Referring now to FIG. 10, an exemplary processing and interface system 1000 is illustrated. In some aspects, access devices 1015, 1010, 1005, such as a paired portable device 1015 or laptop computer 1010 may be able to communicate with an external server 1025 though a communications network 1020. The external server 1025 may be in logical communication with a database 1026, which may comprise data related to identification information and associated profile information. In some embodiments, the server 1025 may be in logical communication with an additional server 1030, which may comprise supplemental processing capabilities.

In some aspects, the server 1025 and access devices 1005, 1010, 1015 may be able to communicate with a cohost server 1040 through a communications network 1020. The cohost server 1040 may be in logical communication with an internal network 1045 comprising network access devices 1041, 1042, 1043 and a local area network 1044. For example, the cohost server 1040 may comprise a payment service, such as PayPal or a social network, such as Facebook or a dating website.

CONCLUSION

A number of embodiments of the present disclosure have been described. While this specification contains many specific implementation details, there should not be construed as limitations on the scope of any disclosures or of what may be claimed, but rather as descriptions of features specific to particular embodiments of the present disclosure.

Certain features that are described in this specification in the context of separate embodiments can also be implemented in combination or in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

What is claimed is:

1. A system for providing an interactive map, wherein the system comprises:
a display;
one or more local input interfaces;
one or more memory resources comprising:
a user profile database;
one or more processors in communication with the display, one or more local input interfaces, and the one or more memory resources, wherein the one or more processors are configured to:
receive a plurality of sets of pin data comprising a first plurality of locations;
define a first set of geofence boundaries based on the first plurality of locations;
define a first local map comprising at least the first set of geofence boundaries, wherein defining compares the first set of geofence boundaries to standard map boundaries;
display an interactive map comprising the first local map;
display a first plurality of pins based on the first plurality of locations on the first local map;
receive a manual location selection;
define a selection set of geofence boundaries based on the manual location selection; and
display one or more of the first plurality of pins located within the selection set of geofence boundaries.

2. The system of claim 1, wherein the selection set of geofence boundaries is based on a threshold number of pins located within the selection set of geofence boundaries.

3. The system of claim 2, wherein a size of each pin is based on a quantity of the first plurality of locations within the selection set of geofence boundaries.

4. The system of claim 1, wherein the first set of geofence boundaries are based at least in part on city limits of each of the plurality of locations.

5. The system of claim 1, wherein the one or more processors are further configured to:
receive a second set of pin data comprising a second plurality of locations;
define a second set of geofence boundaries based on the second plurality of locations;
define a second local map comprising at least the second set of geofence boundaries, wherein defining compares the second set of geofence boundaries to standard map boundaries;
define a third set of geofence boundaries based on comparing the first local map to the second local map identify a second pin area, wherein the third set of geofence boundaries contain both the first set of geofence boundaries and the second set of geofence boundaries; and
define a second local map comprising at least the third set of geofence boundaries, wherein defining compares the third set of geofence boundaries to standard map boundaries.

6. The system of claim 5, wherein the one or more processors are further configured to:
display a second interactive map comprising the second local map; and
display a second plurality of pins based on the first plurality of locations and the second plurality of locations on the second local map.

7. The system of claim 6, wherein the one or more processors are further configured to:
compare the first plurality of locations to the second plurality of locations, wherein the comparing identifies a proximity between each of the first plurality of locations and each of the second plurality of locations; and
define a plurality of pin geofence boundaries of the second plurality of pins based on the comparing of the first plurality of locations to the second plurality of locations, wherein the defining occurs where the proximity is less than a predefined threshold distance, and wherein display of the second plurality of pins comprises a pin for each of the plurality of pin geofence boundaries.

8. The system of claim 7, wherein a size of each pin is based on a quantity of the first plurality of locations and the second plurality of locations within each of the plurality of pin geofence boundaries.

9. The system of claim 1, wherein the one or more processors are further configured to:
associate one or more pin types with the first plurality of pins, wherein display of each of the first plurality of pins is displayed according to at least one of the one or more pin types.

10. The system of claim 1, wherein each of the one or more local input interfaces is configured to at least partially encrypt received input data.

11. A method for displaying an interactive map comprising:
receiving a first plurality of sets of pin data comprising a first plurality of locations;
defining a first set of geofence boundaries based on the first plurality of locations;
defining a first local map comprising at least the first set of geofence boundaries, wherein defining compares the first set of geofence boundaries to standard map boundaries;
displaying an interactive map comprising the first local map; and
displaying a first plurality of pins based on the first plurality of locations on the first local map;
comparing the first plurality of locations, wherein the comparing identifies a proximity between each of the first plurality of locations; and
defining a plurality of pin geofence boundaries of the first plurality of pins based on the comparing of the first plurality of locations, wherein the defining occurs where the proximity is less than a predefined threshold distance.

12. The method of claim 11, wherein the geofence boundaries of the first set of geofence boundaries are based at least in part on city limits of the first plurality of locations.

13. The method of claim 11, wherein a size of each pin is based on a quantity of the first plurality of locations within each of the plurality of pin geofence boundaries.

14. The method of claim 11, further comprising:
receiving a second plurality of sets of pin data comprising a second plurality of locations;
defining a second set of geofence boundaries based on the second plurality of locations;
defining a second local map comprising at least the second set of geofence boundaries, wherein defining compares the second set of geofence boundaries to standard map boundaries;
defining a third set of geofence boundaries based on comparing the first local map to the second local map identify a second pin area, wherein the third set of geofence boundaries contain both the first set of geofence boundaries and the second set of geofence boundaries; and defining a second local map comprising at least the third set of geofence boundaries, wherein defining compares the third set of geofence boundaries to standard map boundaries.

15. The method of claim 14, further comprising:

displaying a second interactive map comprising the second local map; and displaying a second plurality of pins based on the first plurality of locations and the second plurality of locations on the second local map.

16. The method of claim 15, further comprising comparing the first plurality of locations to the second plurality of locations, wherein the comparing identifies a proximity between each of the first plurality of locations and each of the second plurality of locations; and defining a plurality of pin geofence boundaries of the second plurality of pins based on the comparing of the first plurality of locations to the second plurality of locations, wherein the defining occurs where the proximity is less than a predefined threshold distance, and wherein display of the second plurality of pins comprises a pin for each of the plurality of pin geofence boundaries.

17. The method of claim 16, wherein a size of each pin is based on a quantity of the first plurality of locations and the second plurality of locations within each of the plurality of pin geofence boundaries.

18. The method of claim 11, further comprising:

associating one or more pin type with the first plurality of pins, wherein display of each of the first plurality of pins is displayed according to at least one of the one or more pin types.

19. The method of claim 18, wherein the first plurality of sets of pin data further comprises at least one association.

20. The method of claim 11, wherein the method further comprises:

receiving one or more user preferences; and filtering display of the first plurality of pins based on the one or more user preferences.

* * * * *